April 28, 1970  E. P. SIMONSON  3,508,775

SAFETY NUT

Filed Sept. 26, 1968

INVENTOR.
EUGENE P. SIMONSON

BY
Andrew L. Vey
ATTORNEY

United States Patent Office 3,508,775
Patented Apr. 28, 1970

3,508,775
SAFETY NUT
Eugene P. Simonson, Glenside, Pa., assignor to Standard Pressed Steel Co., Jenkintown, Pa., a corporation of Pennsylvania
Filed Sept. 26, 1968, Ser. No. 762,920
Int. Cl. F16b 5/02
U.S. Cl. 287—189.36    3 Claims

ABSTRACT OF THE DISCLOSURE

A nut having a lipped cavity in its bearing surface. The lip of the cavity is arranged to compress a circumferentially compressible collar carried by a mating bolt as this bolt is turned into the nut, whereby the collar can pass through the lip to be captivated within the cavity. The lip of the cavity also is arranged to compress the collar as the bolt is turned out of the nut, whereby the collar can pass through the lip and be free of the cavity.

---

Figure 1:
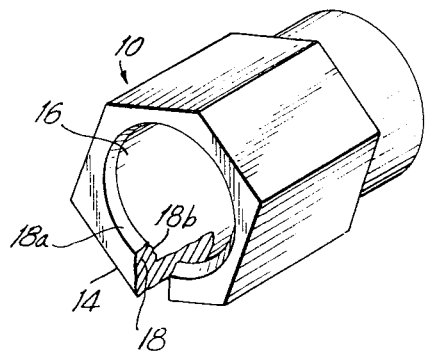

The present invention relates to fasteners arranged to retain a bolt in a bolt hole in the event that a nut turned onto the bolt threads tends to back off of the bolt due to vibrations.

At the present time, it is common in both commercial and military aircraft to require in certain critical applications where vibrations tend to become a problem that the fastening system employed provide what is known as a "belt and suspenders" effect. Besides the threaded engagement between a nut and a bolt, additional means are provided to resist the tendency of the two to become separated as the system is subjected to vibrations. For example, the nut may be castellated and the bolt provided with a diametral hole so that a cotter pin may be used to prevent the nut from backing off of the bolt. Dependent upon the application, the fastening system may have one or more degrees of added protection against separation of the fastener devices and the structural members being secured together.

Among the problems with devices and techniques employed in the past to provide these added safeguards against joint separation are undesirably high cost in the fabrication and installation of the fastening systems and complexity in the arrangement of the component parts. In addition, in certain instances in the past, the fastening systems were not sufficiently foolproof and were very susceptible to the possibility that a workman installing the fastener system might omit to install a particular part vital to the integrity of the joint.

Accordingly, it is an object of the present invention to provide a new and improved fastener system which provides added protection against the separation of a joint subjected to vibrations.

It is another object of the present invention to provide a fastening system which is relatively simple in construction and inexpensive to fabricate.

It is a further object of the present invention to provide a fastening system which overcomes the shortcomings and limitations of presently available comparable devices.

These objects, as well as others, are achieved according to a preferred embodiment of the present invention by providing a nut having an internally threaded bore spaced from the bearing surface of the nut by a lipped cavity. The lip of the cavity defines a passage from the bearing surface of the nut into the cavity. The nut is arranged to engage a bolt having a circumferentially compressible collar carried in a groove spaced from the head of the bolt at a distance which is greater than the grip length of the joint into which the bolt and the nut are to be installed. As the bolt is passed through the structural members to be joined together, the collar is compressed until it passes completely through a joint. At this point the collar is free to assume its initial condition, whereby it provides a first degree of protection against the bolt backing out of the joint if the nut and the bolt become disengaged. As the nut is turned onto the bolt, the collar carried by the bolt again is compressed by the lip of the cavity on the nut. Once the lip passes over the compressed collar and the bearing surface of the nut bears against the joint, the collar is free to return to its uncompressed condition within the cavity in the nut. With the collar in the cavity, a second degree of protection against joint separation is provided.

For a better understanding of the present invention, together with other and further objects thereof, reference is made to the following description, taken in connection with the accompanying drawing, and its scope will be pointed out in the appended claims.

Figure 2:
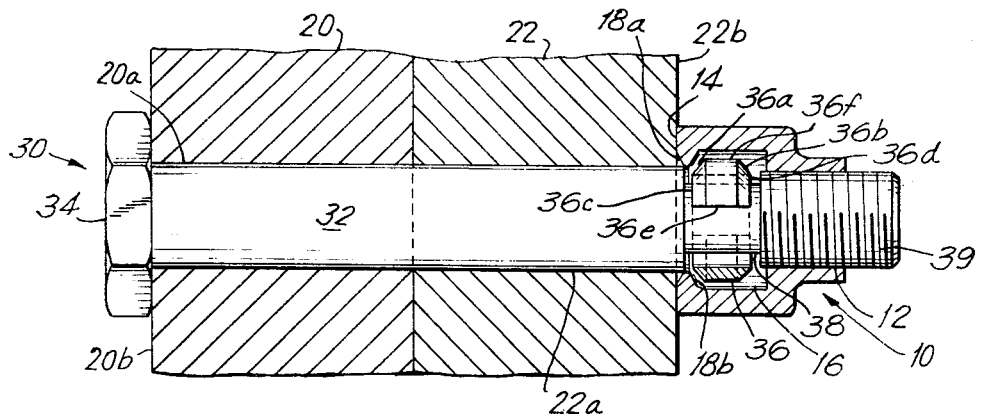

Referring to the drawing:

FIGURE 1 is a perspective view, partially broken away, of a preferred embodiment of a nut constructed in accordance with the present invention; and FIGURE 2 is a vertical view, partially in section, of a joint assembled in accordance with the present invention.

Referring to the drawing, a nut 10 constructed in accordance with the present invention has an internally threaded bore 12 spaced from the bearing surface 14 of the nut by a cavity 16 having a lip 18. The lip 18 defines a passage from the bearing surface 14 into cavity 16. For the embodiment of the invention illustrated, the lip is formed by a first conic section presenting a surface 18a toward the bearing surface 14 and a second conic section presenting a surface 18b toward cavity 16, as illustrated.

The external surface of nut 10 is adapted to be engaged by a suitable wrenching tool. Nut 10 may be arranged to be engaged by a wrench in the area of threaded bore 12 or cavity 16.

FIGURE 2 illustrates the manner in which two structural members 20 and 22 may be secured together in accordance with the present invention. Members 20 and 22 are positioned adjacent one another with holes 20a and 22a aligned so as to provide a clear passage from outside surface 20b of member 20 to outside surface 22b of member 22. Members 20 and 22 are secured together by a bolt assembly 30 and nut 10. Bolt assembly 30 includes a bolt having a threaded shank 32 extending through holes 20a and 22a and an enlarged head 34 bearing against outside surface 20b of member 20. The bolt carries a circumferentially compressible spring collar 36 in an annular groove 38 positioned at or adjacent the thread runout of the bolt and at a distance from bolt head 34 which is slightly greater than the grip length of the joint. As a result, as the bolt is inserted into the passage formed by holes 20a and 22a, collar 36 is compressed circumferentially to permit its passage through members 20 and 22. After collar 36 exits from surface 22b, it returns to its uncompressed state to a point where it is larger than the diameter of the holes through which it has passed. Such expansion positions and retains the bolt in members 20 and 22 even though the bolt is disengaged from nut 10.

To facilitate the insertion of the bolt into members 20 and 22, collar 36 is provided with an external surface having first and second frusto conic sections 36a and 36b separated by a cylindrical section 36f. Frusto conic section 36a has a top defining an edge 36c of the collar which is presented toward bolt head 34, while frusto conic section 36b has a top defining a second edge 36d of the collar which is presented toward the bolt threads 39. The diameters of the tops of frusto conic sections 36a and 36b are equal to each other and when collar 36 is uncompressed they are equal to or slightly less than the diameter of holes 20a and 22a. The maximum external diameter of the uncompressed collar is greater than the diameter of holes 20a and 22a so that upon engagement of the collar with surface 22b, the bolt is retained. The maximum external diameter of the circumferentially compressed collar is less than the diameter of holes 20a and 22a so that the collar may pass through these holes. Collar 36 is provided with a slot 36e throughout the axial extent of the collar of sufficient width to provide for the required circumferential compressibility of the collar.

Once the bolt assembly is installed in members 20 and 22, nut 10 may be turned onto threads 39 of the bolt. As this occurs, surface 18a of lip 18 of the nut engages frusto conic section 36b of collar 36. This causes collar 36 to be compressed circumferentially until lip 18 passes over cylindrical section 36f of the collar. At this point, the collar is within cavity 16 of nut 10 and because the diameter of the cavity is greater than the maximum external diameter of the uncompressed collar, collar 36 is permitted to assume its uncompressed state.

The various bearing surfaces of collar 36 and lip 18 preferably are arranged to offer two degrees of added resistance to joint separation in the event that nut 10 tends to back off of bolt 30 and yet present surfaces which facilitate the insertion of the bolt and the seating of the nut without the need of additional tools for compressing the collar. The relationship between ease of installation and resistance to joint separation is dependent upon the angles of the various inclined surfaces of collar 36 and lip 18 and may be changed from one application to the next. For the embodiment illustrated, the angles of surfaces 36a and 36b of the collar are the same, while surface 18b of the lip is slightly steeper relative to the axis of the nut than is surface 18a. As a result, the system is easier to assemble than to disassemble.

The provision of a lipped cavity in nut 10 results in a two-fold retention of the bolt by the nut as the nut is being seated. In contrast, in certain present day practices, for example, with the use of cotter pins, the final degree of protection against joint separation is provided after the nut is seated. In the event that the assembler fails to carry out this last step of installing the cotter pin, the added protection provided for in the system is, in fact, not provided. In the present invention, this problem is avoided and the provision of a final degree of protection does not require an additional assembly operation.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A joint comprising:

a stack of members positioned adjacent one another and having a hole extending from a first outside surface of said stack to a second outside surface of said stack;

a self-retained bolt assembly including a bolt having a threaded shank extending through said hole in said stack and an enlarged head bearing against said first outside surface of said stack, said bolt also having a circumferentially compressible spring collar carried by said bolt in an annular groove positioned at or adjacent the thread runout and at a distance from said bolt head which is greater than the length of said hole in said stack, the bolt diameter along the groove being less than the shank diameter, the external surface of said collar including first and second frusto-conic sections positioned with said first frusto-conic section having a top defining an edge of said collar which is presented toward said bolt head and said second frusto-conic section having a top defining a second edge of said collar which is presented toward the bolt threads, the diameters of said tops of said frusto-conic sections being equal to each other and when the collar is uncompressed being equal to or slightly less than the diameter of said hole through said stack, the bore diameter of the uncompressed collar being larger than the groove diameter, the maximum external diameter of the uncompressed collar being greater than the diameter of said hole through said stack, the maximum external diameter of the circumferentially compressed collar is no greater than the diameter of said hole through said stack, and said collar having a slot throughout the axial extent thereof of sufficient width to provide for the circumferential compressibility;

and a nut having an internally threaded bore turned onto said bolt threads and spaced from the bearing surface of said nut by a lipped cavity within which said bolt collar is located as said bearing surface of said nut bears against said second outside surface of said stack, the diameter of said cavity being greater than the maximum external diameter of the uncompressed collar and the lip of said cavity defining a passage from said bearing surface into said cavity, said passage having a diameter which is greater than the maximum external diameter of the compressed collar and less than the maximum external diameter of the uncompressed collar, said lip formed by first and second conic sections presenting surfaces toward said bearing surface and said cavity, respectively, the angle between the surface of said first conic section and the axis of said bolt toward said head of said bolt and the angle between the surface of said second conic section and said axis toward said thread of said bolt both being less than 90°.

2. A joint comprising:

a stack of members positioned adjacent one another and having a hole extending from a first outside surface of said stack to a second outside surface of said stack;

a self-retained bolt assembly including a bolt having a threaded shank extending through said hole in said stack and an enlarged head bearing against said first outside surface of said stack, said bolt also having a circumferentially compressible spring collar carried by said bolt in an annular groove positioned at or adjacent the thread runout and at a distance from said bolt head which is greater than the length of said hole in said stack, the bolt diameter along the groove being less than the shank diameter, the external surface of said collar including first and second frusto-conic sections positioned with said first frusto-conic section having a top defining an edge of said collar which is presented toward said bolt head and said second frusto-conic section having a top defining a second edge of said collar which is presented toward the bolt threads, the diameters of said tops of said frusto-conic sections being equal to each other and when the collar is uncompressed being equal to or slightly less than the diameter of said hole through said stack, the bore diameter of the uncompressed collar being larger than the groove diameter, the maximum external diameter of the uncompressed collar being greater than the diameter of said hole through said stack, the maximum external diameter of the circumferentially compressed collar is no greater than the diameter of said hole through said stack, and said collar having a slot throughout the axial extent thereof of sufficient width to provide for the circumferential compressibility;

and a nut having an internally threaded bore turned onto said bolt threads and spaced from the bearing surface of said nut by a lipped cavity within which said bolt collar is located as said bearing surface of said nut bears against said second outside surface of said stack, the diameter of said cavity being greater than the maximum external diameter of the uncompressed collar and the lip of said cavity defining a passage from said bearing surface into said cavity, said passage having a diameter which is greater than the maximum external diameter of the compressed collar and less than the maximum external diameter of the uncompressed collar, said lip having a surface means cooperating with said first and second frusto-conic sections of said collar to compress said collar upon engagement of said collar and said lip as said nut is turned onto said bolt threads and removed from said bolt threads.

3. A joint comprising:

a stack of members positioned adjacent one another and having a hole extending from a first outside surface of said stack to a second outside surface of said stack;

a self-retained bolt assembly including a bolt having a threaded shank extending through said hole in said stack and an enlarged head bearing against said first outside surface of said stack, said bolt also having radially compressible retaining means carried by said bolt at or adjacent the thread run-out and at a distance from said bolt head which is greater than the length of said hole in said stack, the maximum external dimension of the uncompressed retaining means being greater than the diameter of said hole through said stack, the maximum external dimension of the radially compressed retaining means being no greater than the diameter of said hole through said stack;

and a nut having an internally threaded bore turned onto said bolt threads and spaced from the bearing surface of said nut by a lipped cavity within which said retaining means are located as said bearing surface of said nut bears against said second outside surface of said stack, the diameter of said cavity being greater than the maximum external dimension of the uncompressed retaining means and the lip of said cavity defining a passage from said bearing surface into said cavity, said passage having a diameter which is greater than the maximum external dimension of the compressed retaining means and less than the maximum external dimension of the uncompressed retaining means, said lip formed by first and second conic sections presenting surfaces toward said bearing surface and said cavity, respectively, the angle between the surface of said first conic section and the axis of said bolt toward said head of said bolt and the angle between the surface of said second conic section and said axis toward said thread of said bolt both being less than 90°;

said retaining means of said bolt having surface means cooperating with said first and second conic sections of said lip to compress said retaining means upon engagement of said retaining means and said lip as said nut is turned onto said bolt threads and removed from said bolt threads.

References Cited

UNITED STATES PATENTS

| | | | |
|---|---|---|---|
| 2,108,316 | 2/1938 | Love | 151—69 |
| 2,402,583 | 6/1946 | Schumacher | 151—19 |
| 2,449,846 | 9/1948 | Gilman | 151—19 |
| 2,643,573 | 6/1953 | Johnson | 151—69 |
| 3,412,774 | 11/1968 | Schuster | 151—69 |

FOREIGN PATENTS 156,084  2/1922  Great Britain.

EDWARD C. ALLEN, Primary Examiner

U.S. Cl. X.R.

151—69